L. D. PANGBORN.
TREE HOLDER.
APPLICATION FILED JULY 17, 1913.

1,165,360.

Patented Dec. 21, 1915.
2 SHEETS—SHEET 1.

Witnesses:
Fred Palm
Chas. L. Goss.

Inventor:
Leo D. Pangborn
By Flanders Bottum Fawsett & Bottum
Attorneys.

L. D. PANGBORN.
TREE HOLDER.
APPLICATION FILED JULY 17, 1913.

1,165,360.

Patented Dec. 21, 1915.
2 SHEETS—SHEET 2.

Witnesses:
Fred Palm
Chas. W. Goss

Inventor:
Leo D. Pangborn,
By Flanders Bottum Fawcett & Bottum
Attorneys.

UNITED STATES PATENT OFFICE.

LEO D. PANGBORN, OF WATERLOO, WISCONSIN, ASSIGNOR TO THE MADISON NOVELTY CO., OF MADISON, WISCONSIN, A COPARTNERSHIP COMPOSED OF CHARLES D. FICKS AND ALEXANDER C. LEGGETT, OF MADISON, WISCONSIN, AND SAID LEO D. PANGBORN.

TREE-HOLDER.

1,165,360.   Specification of Letters Patent.   Patented Dec. 21, 1915.

Application filed July 17, 1913. Serial No. 779,413.

*To all whom it may concern:*

Be it known that I, LEO D. PANGBORN, a citizen of the United States, residing at Waterloo, in the county of Jefferson and State of Wisconsin, have invented certain new and useful Improvements in Tree-Holders, of which the following is a specification, reference being had to the accompanying drawing, forming a part thereof.

The main object of this invention is to produce a strong, durable and inconspicuous metal holder or stand for Christmas trees and the like, of simple and inexpensive construction, which shall be readily adaptable and applied to tree butts or trunks of different sizes and shapes, and which when in use shall firmly support a tree or the like in an erect position, and when not in use may be folded into small compass for storage or transportation.

It consists in the construction, arrangement and combination of parts as hereinafter particularly described and defined in the appended claims.

In the accompanying drawing like characters designate the same parts in the several figures.

Figure 1:
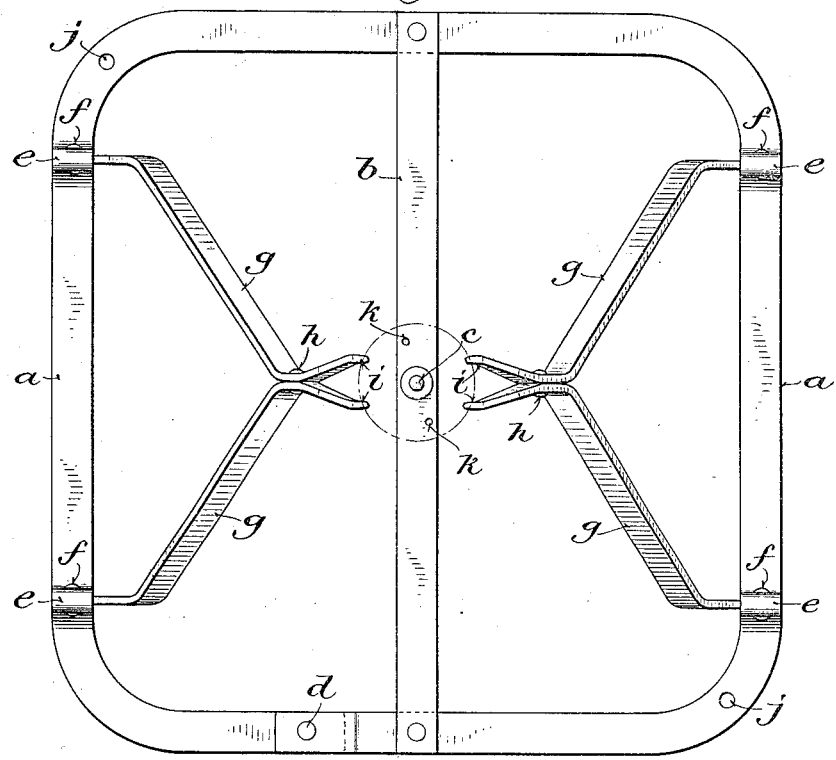
Figure 2:
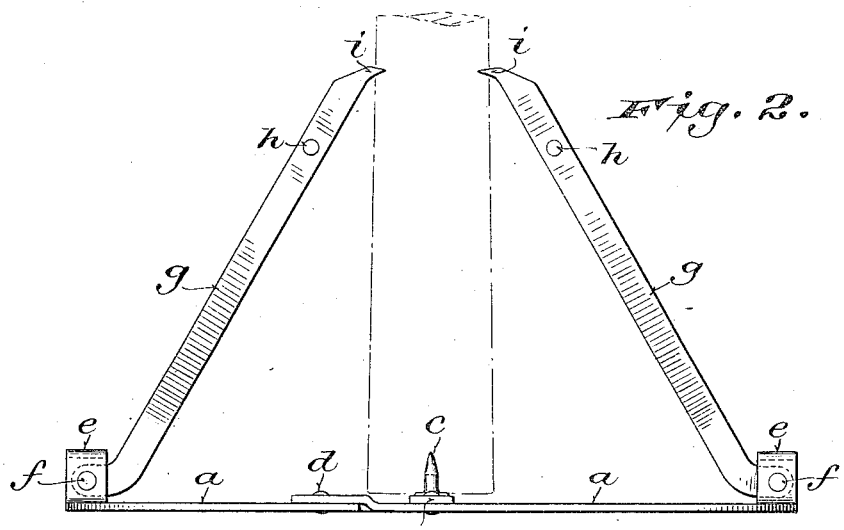
Figure 3:
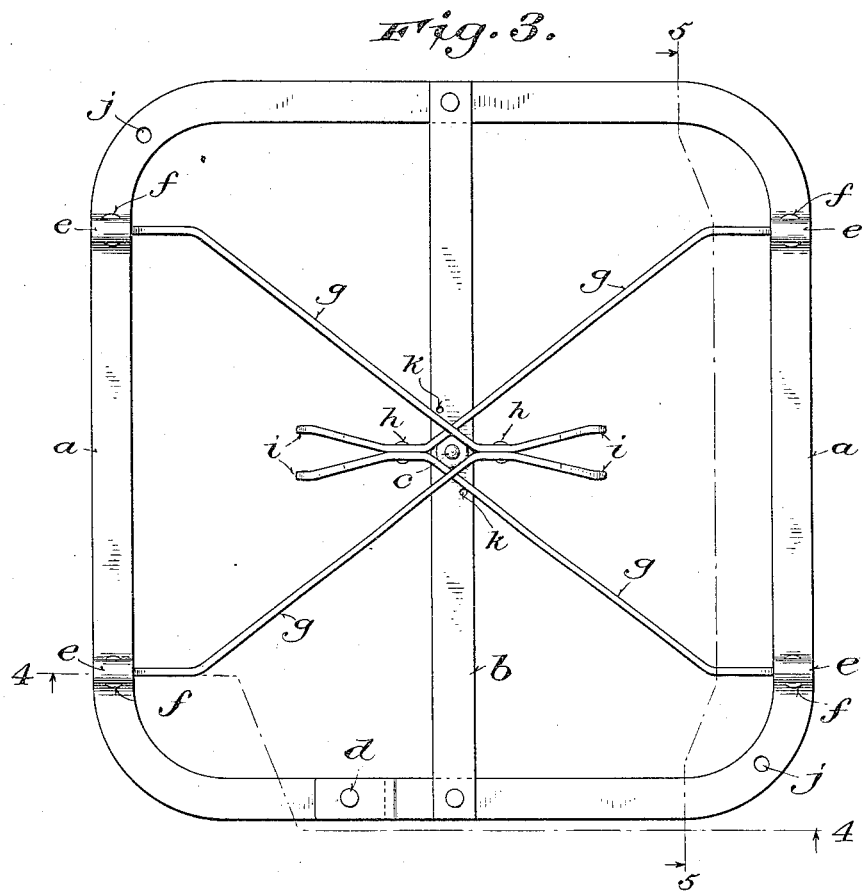
Figure 4:
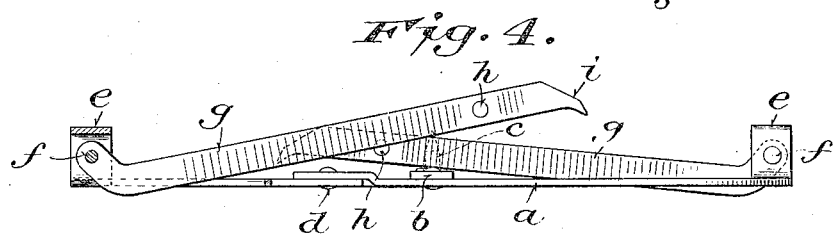
Figure 5:
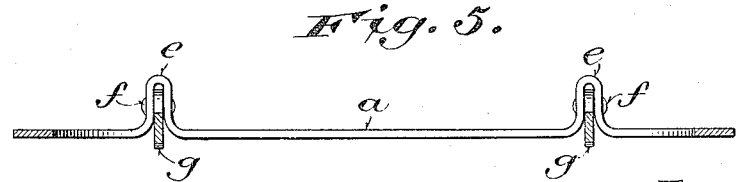

Figure 1 is a plan view of the holder embodying the invention in its preferred form, the braces and dogs being shown as unfolded or turned up into operative position; Fig. 2 is a side elevation of the holder unfolded and in operative condition, the butt or trunk of a tree being indicated in Figs. 1 and 2 by dotted lines; Fig. 3 is a plan view of the holder folded; Fig. 4 is an elevation and partial section of the same on the line 4—4, Fig. 3; and Fig. 5 is a section on the line 5—5, Fig. 3.

The holder or stand comprises a substantially flat base and two folding braces hinged or pivoted to opposite sides of the base and provided at their free ends with dogs for engagement with the butt or trunk of a tree or the like above the base.

The base is preferably constructed as shown, of band metal in the form of an annular or four-sided frame *a*, having round corners and a cross piece *b* riveted or otherwise fastened at the ends to the frame and provided with a central upwardly projecting spike *c*. The ends of the band of which the base frame *a* is made may be lapped and riveted as shown at *d*, or otherwise joined together.

The sides of the frame opposite and parallel with the cross piece *b* are formed with upwardly bent loops *e*, in which the outer and lower ends of the folding braces are hinged or pivoted on pins or rivets *f*. Like the base frame *a*, the braces are preferably made of band metal, each brace consisting as shown in Figs. 1 and 3, of two bands or members *g*, bent toward each other adjacent to their outer ends which are parallel and pivoted at a distance from and in alinement with each other in the loops *e* of the base frame *a*. The inwardly converging bands or members are riveted or otherwise fastened together flatwise adjacent to their inner or free ends which are spread and pointed forming divergent prongs of dogs *i* for engagement with opposite sides of a tree trunk or the like, when the braces are turned up into operative position, as shown in Figs. 1 and 2. By the construction of the braces and their connection with the base frame, as shown and herein described, two folding braces are enabled to firmly support a tree or the like, and the construction and operation of the device are simplified and improved. The brace bands *g* are also bent edgewise adjacent to their outer ends, as shown in Figs. 2 and 4, to permit them to unfold into operative position without interfering with the tops of loops *e* or unnecessarily extending the loops upward. The points of the dogs *i* are hooked or bent inwardly edgewise, as shown in Figs. 2 and 4, to more readily engage with and effectively hold a tree trunk or the like when they are turned up into operative position and driven or forced inwardly into the trunk or the like.

To mount a tree in the holder or stand, the braces and dogs are inverted and turned upwardly and outwardly far enough to clear the butt of the tree, which is impaled centrally on the spike *c*. The tree being supported in an erect position, the dogs *i* are then driven or forced inwardly into engagement with the opposite sides of the trunk. If the tree is symmetrical or approximately balanced, it will be held firmly and steadily by the holder or stand without other fastening, but if it should be large, unsymmetrical or unevenly loaded, the base frame *a* is provided with holes *j* through which it may be nailed or screwed to a floor. The cross piece *b* may be provided with holes *k*, as shown in Figs. 1 and 3, for wiring or tying the braces *g* folded flat against the cross piece, as shown in Figs. 3 and 4, for convenience in transportation.

When the holder is not in use, the braces and dogs are folded as shown in Figs. 3 and 4, and in this condition a number of holders may be nested or packed closely together into small compass for storage or transportation, or a single holder occupying a small space, may be conveniently hung up or laid away, and may be tied or wired and shipped without wrapping.

Various modifications in the details of construction of the device may be made without materially affecting its mode of operation and without departing from the principle of the invention as defined in the following claims.

I claim:

1. In a tree holder the combination of a substantially flat metal base frame and two folding metal braces hinged to opposite sides of said frame and each consisting of inwardly converging members pivoted at their outer ends at a distance from and in alinement with each other to one side of the frame and joined together adjacent to their inner free ends which are provided with a dog for engagement with a tree trunk or the like when the braces are turned up into operative position.

2. In a tree holder the combination of a substantially flat base consisting of a four-sided frame having a cross piece provided with a central upwardly projecting spike, and folding braces each consisting of inwardly converging members pivoted at their outer ends to one side of the base and joined adjacent to their inner free ends, which are spread and pointed to form dogs for engagement with a tree trunk or the like when the braces are turned up into operative position.

3. In a tree holder the combination of a substantially flat base consisting of a band metal frame having a cross piece provided with a central upwardly projecting spike, and braces pivoted to opposite sides of the base frame and each composed of two metal bands converging toward and connected adjacent to their free ends which are pointed and form dogs for engagement with opposite sides of a tree trunk or the like.

4. In a tree holder the combination of a base consisting of a substantially flat band metal frame formed on opposite sides with upwardly bent loops and having a cross piece provided with a central upwardly projecting spike, and folding braces each composed of two metal bands pivoted at one end in the loops in one side of the frame and converging toward and joined flatwise adjacent to their free ends which are pointed and form a dog for engagement with a tree trunk or the like.

In witness whereof I hereto affix my signature in presence of two witnesses.

LEO D. PANGBORN.

Witnesses:
Edw'd F. Vick,
Edw. Torpey.

Copies of this patent may be obtained for five cents each, by addressing the "Commissioner of Patents, Washington, D. C."